Aug. 12, 1969        D. R. BROWN        3,461,362
LOW VALUE SERIES WOUND CAPACITOR AND METHOD OF FABRICATING SAME
Filed May 10, 1967                    2 Sheets-Sheet 1
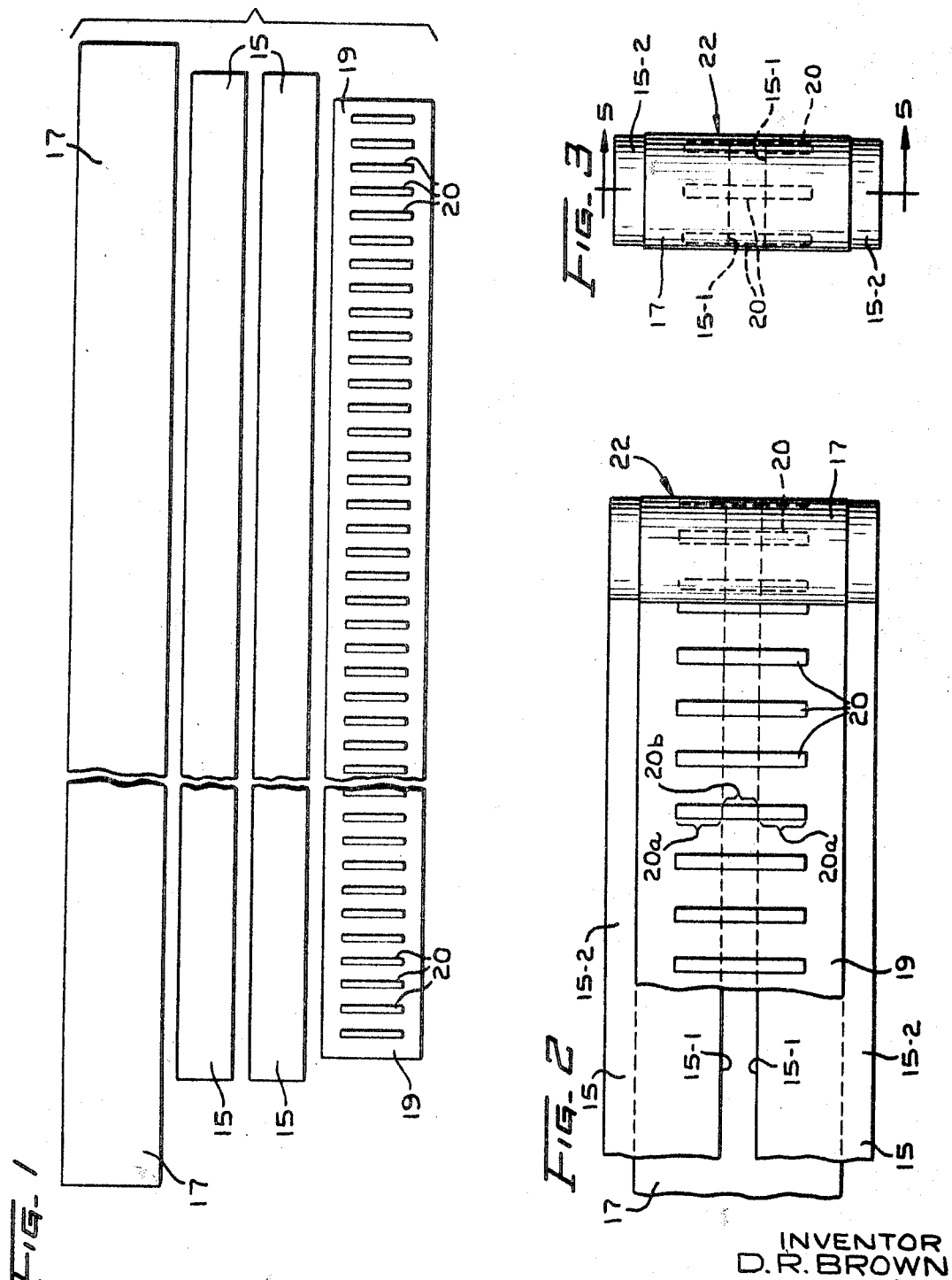
INVENTOR
D. R. BROWN
BY A. C. Schwarz Jr.
ATTORNEY

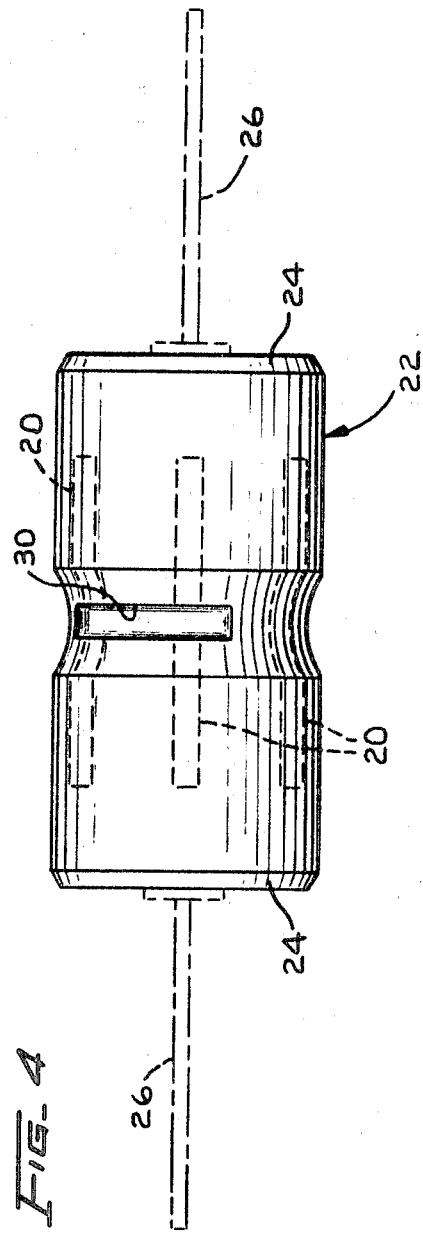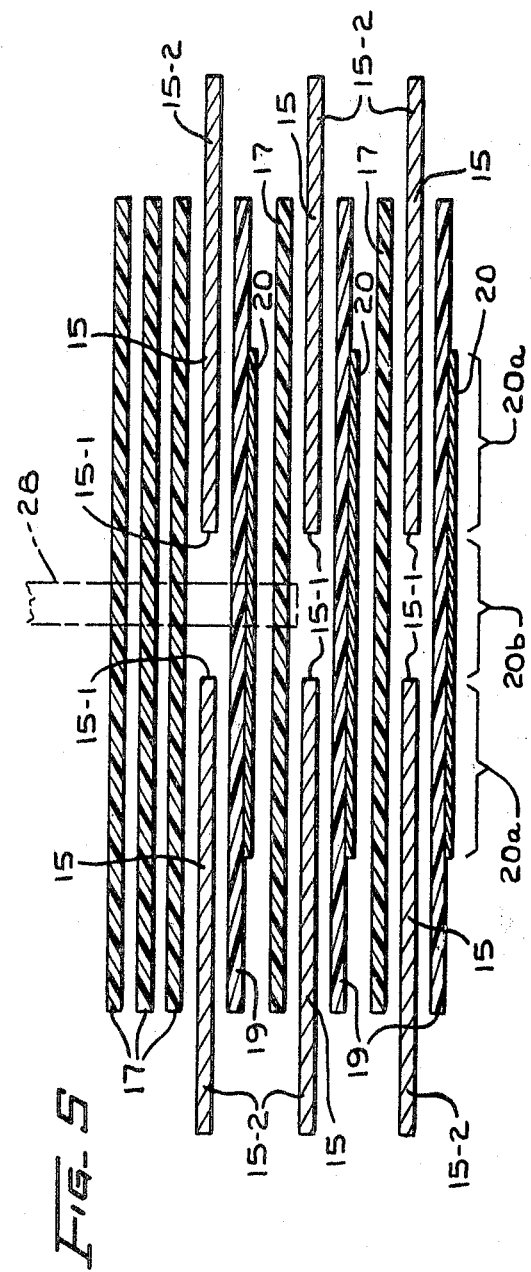

3,461,362
LOW VALUE SERIES WOUND CAPACITOR AND
METHOD OF FABRICATING SAME
Donald R. Brown, Downers Grove, Ill., assignor to Western Electric Company, Incorporated, New York, N.Y., a corporation of New York
Filed May 10, 1967, Ser. No. 637,498
Int. Cl. H01g 13/00
U.S. Cl. 317—260    2 Claims

ABSTRACT OF THE DISCLOSURE

A capacitor, fabricated by metallizing a longitudinal row of narrow electrodes onto a dielectric web transversely thereof, superposing a second dielectric web thereon, superposing a pair of tin foil electrodes onto the second web in laterally spaced relation to each other with the inner marginal portions of the foils overlying end portions of the metallized electrodes and cooperating therewith to form small capacitor sections of minute capacitance value, and with the outer marginal portions of the foils extending beyond the superposed webs, winding the superposed layers into a capacitor roll, and spin swaging the extended foils into terminals. The capacitor is adjusted by removing a portion of the electrode material.

BACKGROUND OF THE INVENTION

Field and objects of the invention

This invention relates to a low value series wound capacitor and a method of making same, and more particularly to a method of making a low value wound capacitor wherein the capacitance thereof during fabrication is increased in increments of a predetermined minute magnitude, and upon completion of fabrication the capacitance may be reduced in increments of such predetermined magnitude.

Objects of the invention are to provide an improved series wound capacitor of low value, and a method of making the same.

Other objects of the invention are to provide an improved method of fabricating a capacitor wherein the capacitance thereof is increased in increments of a predetermined minute magnitude, and a capacitor thus fabricated.

Another object of the invention is to provide a series wound capacitor wherein upon completion of the fabrication of the capacitor the capacitance thereof may be reduced in increments of a predetermined magnitude.

Summary of the invention

The capacitor is fabricated by metallizing a row of laterally spaced narrow electrodes longitudinally of and on one side of a first dielectric web with the electrodes disposed transversely of the web, superposing a second dielectric web over the first, superposing a pair of tin foil electrodes onto the second web in laterally spaced relation to each other and with the inner marginal portions of the foils overlying end portions of the metallized electrodes and cooperating therewith to form a plurality of relatively small capacitor sections of a predetermined capacitance value, respectively, and with the outer marginal portions of the foils extending laterally beyond the superposed webs. The superposed layers are wound into a capacitor roll during which the capacitance is increased progressively in increments of a predetermined relatively small magnitude. Thereafter, the extended foils are spin swaged to form terminals. The capacitance value may be reduced in such small increments by cutting into the capacitor and removing the middle portion of one or more of the metallized electrodes.

Brief description of the drawings

Other objects, advantages and novel aspects of the invention will become apparent upon consideration of the following detailed description in conjunction with the accompanying drawings, in which:

FIG. 1 is a fragmentary plan view of the several capacitor forming strips in side-by-side relation to one another;

FIG. 2 is a fragmentary plan view of the capacitor forming strips in superposed relation to one another and partially wound into a capacitor roll;

FIG. 3 is a view of the capacitor roll upon completion of the winding thereof;

FIG. 4 is an elevational view of the capacitor with the extended foil ends thereof formed into terminals and showing leads attached thereto; and FIG. 5 is an enlarged fragmentary longitudinal diagrammatic sectional view through the capacitor roll taken on the line 5—5 of FIG. 3 and showing the capacitor forming strips in spaced relation to one another.

Detailed description

Referring to the drawings and particularly to FIGS. 1 and 2, the capacitor is fabricated from a plurality of capacitor forming strips including a pair of elongated foil electrodes 15, 15 of tin or tin alloy, an elongated first dielectric web 17, and a second elongated dielectric web 19 which has a longitudinal row of electrodes 20 metallized thereon. The electrodes 20 are disposed transversely of the web 19 in uniformly spaced relation to one another and in spaced relation to the edges of the web 19. The several capacitor forming strips 15, 17 and 19 are wound onto an arbor in superposed relation to one another as indicated in FIG. 2 to form a capacitor roll 22.

The tin foil electrodes 15 are supported in laterally spaced relation to each other between the dielectric webs 17 and 19 with the inner edges 15–1 spaced apart a predetermined distance, and the outer marginal portions 15–2 extending laterally beyond the longitudinal edges of the superposed dielectric webs 17 and 19. The metallized electrodes 20 are disposed in the capacitor roll 22 between the dielectric web 19 and 17 and the end portions 20a of the electrodes 20 are positioned in superposed and overlying relation to inner marginal portions of the tin foil electrodes 15 and cooperates therewith to form relatively small capacitor sections having a capacitance value of a predetermined minute magnitude. The pair of capacitor sections 20a, 20a associated with each metallized electrode 20 are interconnected in series by the intermediate portion 20b of the electrode.

As the capacitor roll 22 is wound the capacitance thereof is increased progressively in relatively small increments of a predetermined value as the successive electrodes 20 are brought into capacitive relation with the foil electrodes 15, 15 of the capacitor. During the winding of the capacitor, the electrodes 15 may be monitored by a capacitance measuring device which may be associated with suitable mechanism for effecting the severance of the capacitor forming strips 15 and 19 when the capacitance has reached a predetermined value and also provide for a predetermined overwinding of the dielectric strip 17.

After sealing the overwound dielectric strip 17 to the capacitor roll, the roll is removed from the winding arbor and is heated to a predetermined temperature for a predetermined time to cause the dielectric webs 15 to shrink longitudinally and compress the capacitor roll into a compacted structure. The foil electrodes 15 extending from opposite ends of the capacitor are then spin swaged by rotating dies pressed axially thereagainst to form terminals 24 at opposite ends of the capacitor. Headed leads 26 may subsequently be soldered to the terminals.

Although the electrodes 20 have been disclosed as being metallized onto the dielectric web 19 it will be understood that such electrodes 20 may be made of foil and adhered to the dielectric web 19 by suitable means, or otherwise interposed between the dielectric webs 17 and 19 during the fabrication of the capacitor roll.

From the above disclosure it will be apparent that during the winding of the capacitor roll the capacitance is increased progressively in small increments of a predetermined magnitude as successive ones of the electrodes 20 are added to the capacitor. This increase in the capacitance value in relatively small increments aids in the monitoring of the capacitance during the winding of the capacitor and in effecting the termination of the winding operation at the desired capacitance value.

Moreover, in the event that the capacitance of a capacitor is slightly higher than desired, an operator may take a sharp tool 28 as indicated in dotted lines in FIG. 5 and cut a slot 30 (FIG. 4) in the capacitor between the inner marginal edges of the foil electrodes 15 and remove a section of the intermediate portion 20b of one or more of the electrodes 20 and thereby reduce the capacitance value of the capacitor in such predetermined small increments until the desired capacitance value has been attained. Upon completion of such cutting operation and the reduction of the capacitance to the desired value, a suitable plastic dielectric material may be pressed into the lot in the capacitor to seal it.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. A capacitor comprising:
   a pair of elongated foil first electrodes convolutely arranged in parallel and laterally spaced edge to edge relation to one another;
   a plurality of second electrodes convolutely arranged in a row parallel to said first electrodes and extending transversely thereof from one to the other and having end portions in overlying and opposed relation to said first electrodes, respectively, and cooperating therewith to form a plurality of capacitor sections, respectively, of a predetermined capacitance value;
   means for supporting said first and said second electrodes in spaced insulated relation to each other with the outer longitudinal marginal portions of said first electrodes accessible; and
   a filled slot extending radially inward from the surface of the capacitor and located between said pair of spaced first electrodes.

2. A method of fabricating a capacitor which comprises:
   forming a plurality of first electrodes in a row on one side of an elongated dielectric web longitudinally thereof with the electrodes extending transversely of the web;
   supporting a pair of foil electrodes in parallel and laterally spaced relation to each other in engagement with the opposite side of said first dielectric web and with the inner marginal portions of the foil electrodes in superposed and overlying relation to the end portions, respectively, of the first electrodes and cooperating therewith to form a plurality of capacitor sections, respectively, of a predetermined capacitance value and with the outer marginal portions of the foil electrodes extending laterally beyond said dielectric webs;
   supporting a second elongated dielectric web in aligned and superposed relation to the first dielectric web and in engagement with the opposite sides of the foil electrodes;
   winding the electrodes and the dielectric webs into a capacitor roll with the outer marginal portions of the foil electrodes extending beyond the dielectric webs and forming terminals at opposite ends of the capacitor roll; and
   severing at least one of said first electrodes between said paid of foil electrodes.

References Cited

UNITED STATES PATENTS

| 697,507 | 4/1902 | Mansbridge | 317—260 |
| 3,237,274 | 3/1966 | Kalina | 317—260 |

FOREIGN PATENTS

| 849,510 | 4/1958 | Great Britain. |

OTHER REFERENCES

Grouse, R. A., Interim report on the Metallized Products Company's high voltage metallized capacitor brochure of Metallized Products Co. Inc., Norwalk, Conn., July 1963.

LEWIS H. MYERS, Primary Examiner

E. A. GOLDBERG, Assistant Examiner

U.S. Cl. X.R.

29—25; 317—242